(12) United States Patent
Shiraki et al.

(10) Patent No.: US 7,196,511 B2
(45) Date of Patent: Mar. 27, 2007

(54) MAGNETIC POSITION DETECTING APPARATUS HAVING A PLURALITY OF MAGNETIC RESISTANCE CIRCUITS ARRANGED IN A COMBLIKE SHAPE

(75) Inventors: Manabu Shiraki, Yamato (JP); Junichi Tada, Yamato (JP)

(73) Assignee: Shicoh Engineering Co., Ltd., Kanagawa (JP)

( * ) Notice: Subject to any disclaimer, the term of this patent is extended or adjusted under 35 U.S.C. 154(b) by 14 days.

(21) Appl. No.: 11/111,936

(22) Filed: Apr. 22, 2005

(65) Prior Publication Data

US 2006/0103374 A1    May 18, 2006

(30) Foreign Application Priority Data

Nov. 16, 2004 (JP) ............................ 2004-331619

(51) Int. Cl.
*G01B 7/14* (2006.01)
*G01B 7/30* (2006.01)

(52) U.S. Cl. ..................... 324/207.21; 324/207.24; 324/207.25

(58) Field of Classification Search ............ None
See application file for complete search history.

(56) References Cited

U.S. PATENT DOCUMENTS

| 5,036,276 | A | * | 7/1991 | Aizawa | 324/207.21 |
|---|---|---|---|---|---|
| 5,047,716 | A | * | 9/1991 | Katagiri | 324/207.21 |
| 5,216,363 | A | * | 6/1993 | Masaaki | 324/207.21 |
| RE34,355 | E | * | 8/1993 | Takahashi et al. | 324/207.21 |
| 5,243,280 | A | * | 9/1993 | Kusumi | 324/207.21 |
| 5,386,642 | A | * | 2/1995 | Spies et al. | 33/708 |
| 5,430,373 | A | * | 7/1995 | Ichikawa et al. | 324/207.21 |
| 5,680,042 | A | * | 10/1997 | Griffen et al. | 324/207.21 |
| 6,246,233 | B1 | * | 6/2001 | Griffen et al. | 324/207.21 |
| 6,300,758 | B1 | * | 10/2001 | Griffen et al. | 324/207.21 |

FOREIGN PATENT DOCUMENTS

| JP | 50-81116 | 7/1975 |
|---|---|---|
| JP | 7-4987 | 1/1995 |

* cited by examiner

*Primary Examiner*—Jay M. Patidar
(74) *Attorney, Agent, or Firm*—Wenderoth, Lind & Ponack, L.L.P.

(57) ABSTRACT

A magnetic position detecting apparatus of the present invention includes a first magnetic resistance circuit and a second magnetic resistance circuit each having multiple magnetic resistance elements arranged to be opposite to a magnetized surface, wherein the first and the second magnetic resistance circuits are arranged in such a way that the resistance elements of the first and the second magnetic resistance circuits are connected to one another in series and arranged in a comblike shape to be parallel to one another along a current path of each magnetic resistance element, the magnetic resistance elements of the second magnetic resistance circuit are placed between the magnetic resistance elements of the first magnetic resistance circuit.

4 Claims, 5 Drawing Sheets

MAGNETIC POSITION DETECTING APPARATUS HAVING A PLURALITY OF MAGNETIC RESISTANCE CIRCUITS ARRANGED IN A COMBLIKE SHAPE

BACKGROUND OF THE INVENTION

1. Field of the Invention

The present invention relates to a position detecting apparatus that detects a position of a driving member which linearly moves or rotates, and particularly to a magnetic position detecting apparatus using magnetism.

2. Description of the Related Art

As a position detecting apparatus of this kind, Examined Japanese Patent Publication No. 54-41335 (patent document 1) discloses a structure in which first and second magnetic resistance circuits, each having multiple magnetic resistance elements connected in series, are formed in a comblike shape and the first and the second magnetic resistance circuits are horizontally arranged along a magnetic pole array direction.

Unexamined Japanese Patent Publication No. 7-4987 (patent document 2) discloses a technique in which a groove is formed on a magnetized surface to shape an output waveform from a magnetic resistance circuit at a reference position.

However, in the technique of patent document 1, since the multiple magnetic resistance circuits in the magnetic position detecting apparatus are arranged along the magnetic pole array direction, when one magnetic resistance circuit has numerous magnetic resistance elements or numerous magnetic resistance circuits are provided, there is a problem in which the length in the circuit in the magnetic pole array direction is increased to cause enlargement in size of the position detecting apparatus and a decrease in resolution of the output waveform.

Moreover, in patent document 2, when the multiple magnetic resistance circuits are provided, there occurs a problem of enlargement in size of the position detecting apparatus, similar to patent document 1. Moreover, in the position detecting apparatus of the driving member that rotates, there is a problem in which when a length of a position detecting apparatus in a width direction is increased, electric field strength received at both ends of the width direction of the position detecting apparatus is reduced by its positional shift, so that resolution of the output waveform is decreased.

SUMMARY OF THE INVENTION

The present invention has been made with consideration given to the aforementioned circumstances and an object of the present invention is to miniaturize a position detecting apparatus and provide a magnetic position detecting apparatus that is excellent in resolution.

According to the present invention, there is provided a magnetic position detecting apparatus that includes first and second magnetic resistance circuits each having multiple magnetic resistance elements arranged to be opposite to a magnetized surface where different magnetic poles are alternatively provided and each outputting current according to magnetic field strength of the magnetized surface. The magnetic position detecting apparatus further includes a power supply terminal provided in each magnetic resistance circuit. The magnetic position detecting apparatus further includes output terminals provided in each magnetic resistance circuit. The first and second magnetic resistance circuits may be arranged in such a way that the resistance elements of each of the magnetic resistance circuits are connected to one another in series and arranged in a comblike shape to be parallel to one another along a current path of each magnetic resistance element, and the magnetic resistance elements of the second magnetic resistance circuit are placed between the magnetic resistance elements of the first magnetic resistance circuit.

According to the configuration of the present invention, the first magnetic resistance circuit and the second magnetic resistance circuit are formed in a comblike shape and the magnetic resistance elements of the second magnetic resistance circuit are placed between the magnetic resistance elements of the first magnetic resistance circuit. This makes it possible to reduce an area where the magnetic resistance circuits are arranged and improve miniaturization of the magnetic position detecting apparatus. Moreover, arrangement of the magnetic resistance elements can be integrated with respect to the magnetic pole width $\lambda$ (referred to FIG. 1) of the magnetized surface. This makes it possible to reduce a circuit width of the entire magnetic position detecting apparatus and improve detection accuracy and resolution even when numerous magnetic resistance elements are arranged to provide amplification magnetic resistance circuits and correction magnetic resistance elements that shape output waveforms. Particularly, the detection width of the position sensor is reduced, thereby making it possible to decrease an interval error between each magnetic resistance element and the magnetized surface even when the magnetized surface is circularly shaped or curved. In addition, a difference in magnetic field strength is reduced, thereby making it possible to obtain an output waveform with high resolution.

In the present invention, it is preferable that the magnetic resistance elements, which configure at least either the first or the second magnetic resistance circuit, include a reference magnetic resistance element and correction magnetic resistance elements that are shifted by ($\lambda/n$) or ($\lambda/2m$) from the reference magnetic resistance element, and it is preferable that $\lambda$ be a width of a magnetic pole in an array direction of magnetic poles on the magnetized surface, "n" be an even number excepting 0, and "m" be an odd number excepting 1.

According to the configuration of the present invention, an even harmonic component of the output wavelength is corrected by the magnetic resistance elements shifted by $\lambda/n$ and an odd harmonic component of the output wavelength is corrected by the magnetic resistance elements shifted by $\lambda/2m$, thereby making it possible to obtain a sine waveform S and a cosine waveform C in a state that a reference wavelength h is adjusted as illustrated in FIG. 4. Such adjusted sine waveform S and cosine waveform C are obtained, thereby making it possible to accurately detect a position within the width $\lambda$ and improve resolution.

Moreover, in the present invention, it is preferable that a phase difference between output waveforms of the first magnetic resistance circuit and the second magnetic resistance circuit be shifted by 90°.

The sine waveform S and the cosine waveform C are output simultaneously as illustrated in FIG. 4, thereby making it possible to detect a relative moving direction and a moving speed of the magnetic position detecting apparatus to the magnetized surface.

Furthermore, in the present invention, it is preferable that a portion for connecting the respective magnetic resistance elements in be formed of conductive material.

Since the respective magnetic resistance elements are placed in parallel to one another along the current path, the connecting portion of each magnetic resistance element cannot be placed in parallel to the current path. Accordingly, the connecting portion is formed of not the magnetic resistance element but conductive material, so that output can be obtained in a state that no influence of the magnetic field of the magnetized surface is exerted upon the connecting portion and the waveform accuracy of the output waveform can be further improved.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

Figure 1:
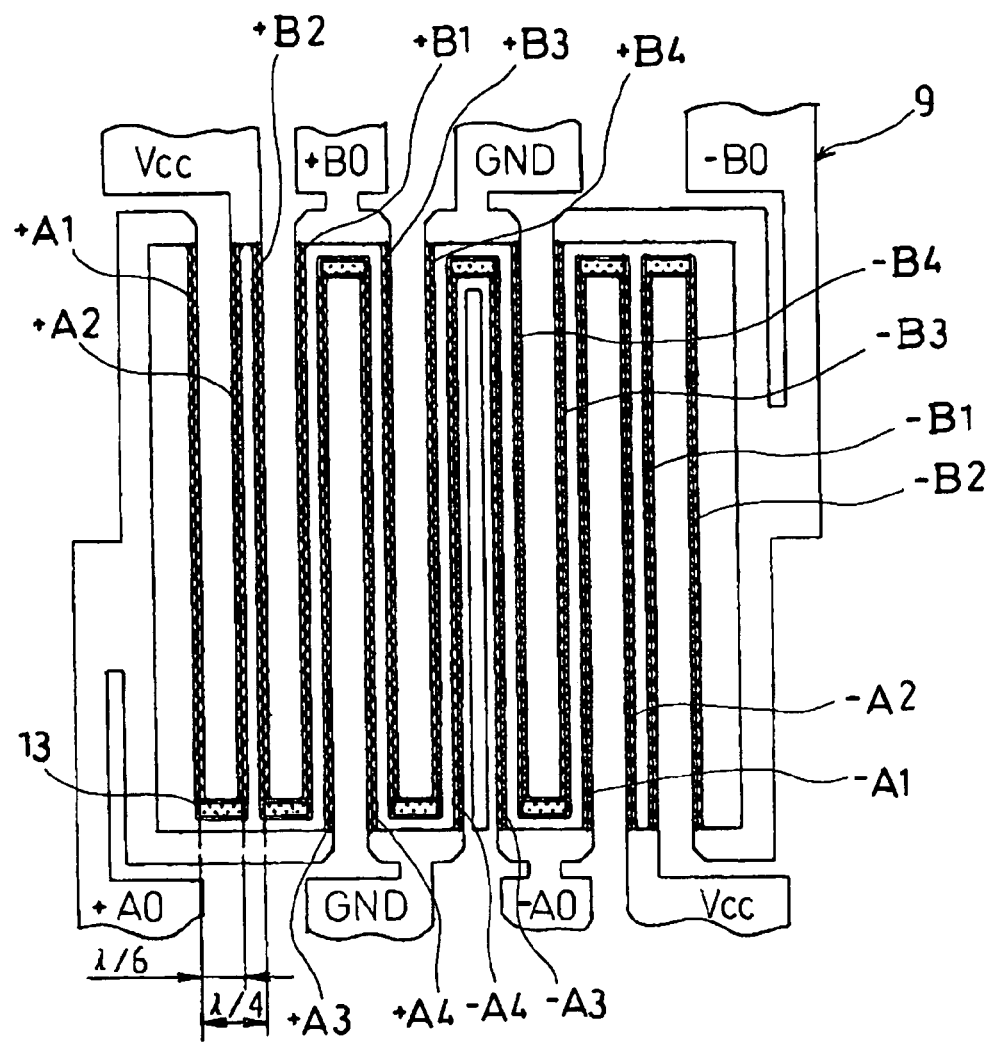
FIG. 1 is a plane view illustrating the relationship between a pattern circuit and a magnetized surface in a magnetic position detecting apparatus according to an embodiment of the present invention.
Figure 1:
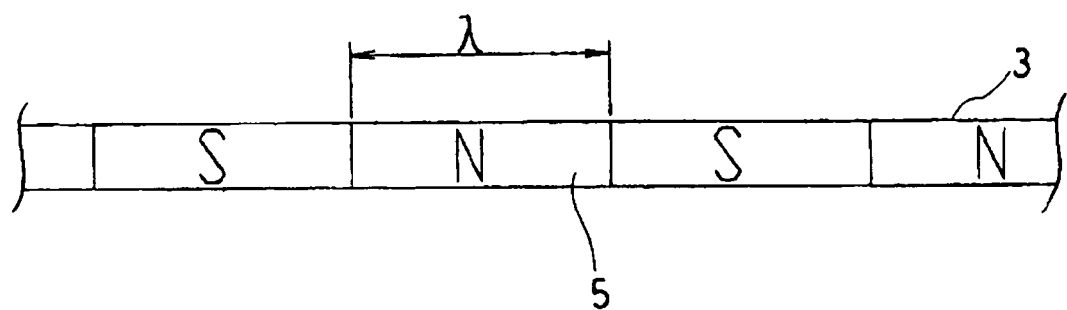
Figure 2:
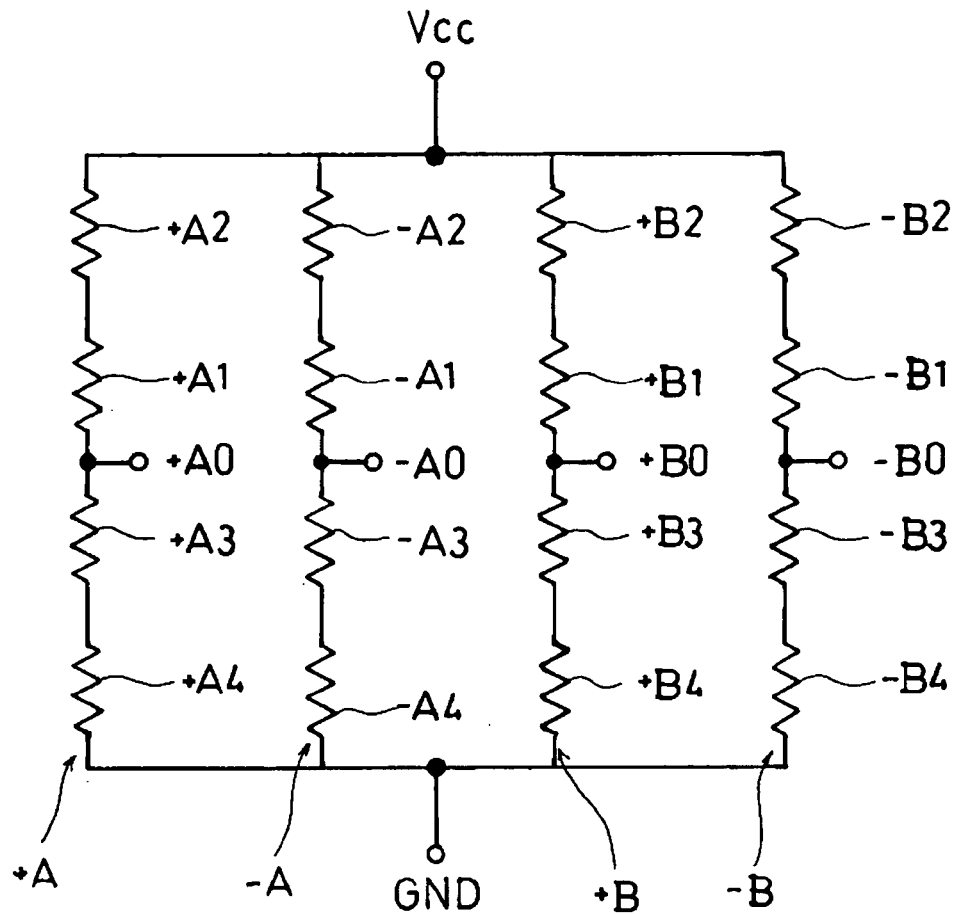
FIG. 2 is an equivalent circuit diagram of a magnetic position detecting apparatus illustrated in FIG. 1.
Figure 3:
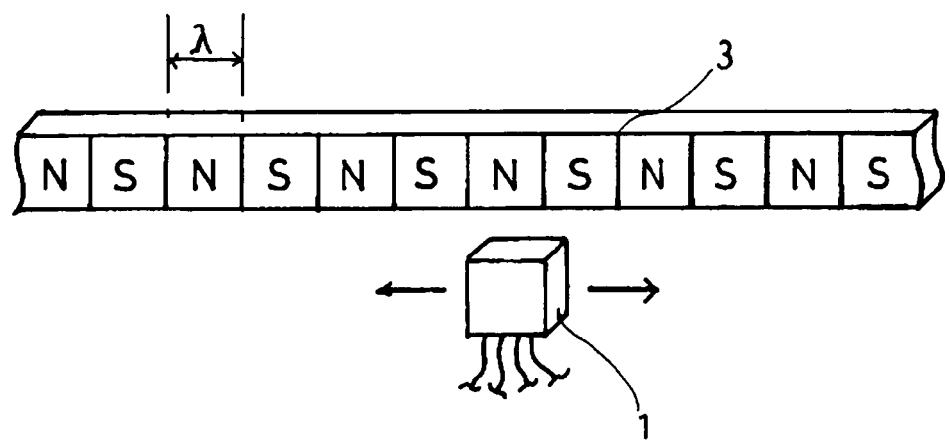
FIG. 3 is a perspective view schematically illustrating a using state of a magnetic position detecting apparatus according to an embodiment of the present invention.

An embodiment of the present invention will be explained with reference to FIGS. 1 to 5.

A magnetic position detecting apparatus 1 according to this embodiment detects a position of a zoom lens or a focus lens of an autofocus camera built in a cellular phone as an example. The camera has a magnetized surface 3 formed according to the drive of the zoom lens or the focus lens. On the magnetized surface 3, magnetic poles 5 including N poles and S poles are connected to one another in series and the N poles and S poles are alternatively formed. A width of one magnetic pole 5 in the array direction of the magnetic pole 5 is $\lambda$.

In the magnetic position detecting apparatus 1, a circuit 9 (pattern circuit) is formed on a base surface, and a surface of the circuit 9 is coated with resin material. The pattern circuit 9 includes a first magnetic resistance subcircuit +A, a second magnetic resistance subcircuit −A, a third magnetic resistance subcircuit +B, a fourth magnetic resistance subcircuit −B. The first to fourth magnetic resistance subcircuits +A, −A, +B, −B are connected to a common power source Vcc and a common earth GND, respectively.

In the present embodiment, the first magnetic resistance circuit A includes the first magnetic resistance subcircuit +A and the second magnetic resistance subcircuit −A. The second magnetic resistance circuit B includes the third magnetic resistance subcircuit +B and the fourth magnetic resistance subcircuit −B.

In the first magnetic resistance circuit A, the first magnetic resistance subcircuit +A and the second magnetic resistance subcircuit −A are placed at a position shifted by $\lambda(360°)$ to make it possible to obtain output waveforms where both outputs are amplified. Similarly, the third magnetic resistance subcircuit +B and the fourth magnetic resistance subcircuit −B are placed at a position shifted by $\lambda$ (360°) to make it possible to obtain output waveforms where both outputs are amplified.

In the first magnetic resistance subcircuit +A, a correction magnetic resistance element +A3 for an even harmonic component is placed at a position shifted by $\lambda/2$ with respect to a reference magnetic resistance element +A1. Also, a correction magnetic resistance element +A2 for an odd harmonic component is placed at a position shifted by $\lambda/6$. Moreover, a correction magnetic resistance element +A4 for an odd harmonic component is placed at a position shifted by $\lambda/6$ with respect to the correction magnetic resistance element +A3.

The correction magnetic resistance element +A3 for an even harmonic component may be placed at a position shifted by $\lambda/n$ ("n" is an even number excepting 0) with respect to the reference magnetic resistance element +A1 and n=2 is given in the present embodiment. The correction magnetic resistance element +A2 for an odd harmonic component may be placed at a position shifted by $\lambda/2m$ ("m" is an odd number excepting 1) with respect to the reference magnetic resistance element +A1 and m=3 is given in the present embodiment. Moreover, the correction magnetic resistance element +A4 may be placed at a position shifted by $\lambda/2m$ (m is an odd number excepting 1) with respect to the correction magnetic resistance element +A3 for an even harmonic component and m=3 is given in the present embodiment.

In connection with the second to fourth magnetic resistance subcircuits −A, +B, −B, similar to the first magnetic resistance subcircuit +A, correction magnetic resistance elements −A3, +B3, −B3 for an even harmonic component are arranged with respect to the reference magnetic resistance elements −A1, +B1, −B1, respectively, and correction magnetic resistance elements −A2, −A4, +B2, +B4, −B2, −B4 for an even harmonic component are arranged, respectively.

Furthermore, in the circuit 9 of the magnetic position detecting apparatus 1, an output terminal of the first magnetic resistance subcircuit +A is +A0, an output terminal of the second magnetic resistance subcircuit −A is −A0, and an output terminal of the third magnetic resistance subcircuit +B is +B0.

The respective magnetic resistance elements +A1 to +A4, −A1 to −A4, +B1 to +B4, −B1 to −B4 are arranged in parallel to one another along a current passage, respectively. Moreover, the first magnetic resistance subcircuit +A and the third magnetic resistance subcircuit +B include magnetic resistance elements +A1 to +A4 and +B1 to +B4 in such a way to form comblike shapes, respectively. The magnetic resistance elements +B2 and +B1 of the other magnetic resistance subcircuit +B are arranged between the comblike arranged magnetic resistance elements +A2 and +A3 of one magnetic resistance subcircuit +A. Similarly, in connection with the magnetic resistance subcircuits −A and −B, the magnetic resistance elements +B3 and +B4 are arranged between the magnetic resistance elements +A4 and −A4. The magnetic resistance elements −B4 and −B3 are arranged between the magnetic resistance elements −A3 and −A1. The magnetic resistance elements −A1 and −A2 are arranged between the magnetic resistance elements −B1 and −B3.

In the magnetic resistance circuits A and B, a connecting portion 13 for connecting each of the parallel-arranged magnetic resistance elements +A1 to +A4, −A1 to −A4, +B1 to +B4, −B1 to −B4 is formed of general conductive material.

An explanation will be next given of a function and an effect according to the present embodiment.

According to the present embodiment, the first magnetic resistance circuit A and the second magnetic resistance circuit B are formed in such a way to have comblike shapes, respectively. The magnetic resistance elements +B1 to +B4 and −B1 to −B4 of the second magnetic resistance circuit B are arranged among the magnetic resistance elements +A1 to +A4 and −A1 to −A4 of the first magnetic resistance circuit A, respectively. Accordingly, the circuit 9 of the magnetic position detecting apparatus (position sensor) 1 is integrated to make it possible to reduce an area and improve miniaturization of the position sensor 1.

Even when numerous magnetic resistance elements +B1 to +B4 and −B1 to −B4 are arranged, since the magnetic resistance elements +B1 to +B4 and −B1 to −B4 can be integrated with respect to the magnetic pole width λ of the magnetized surface 3, it is possible to reduce a detection width of the position sensor 1. Also, since numerous correction magnetic resistance elements can be arranged, accuracy in detection can be improved.

Particularly, the detection width of the position sensor is reduced to make it possible to decrease an interval error between each magnetic resistance element and the magnetized surface even when the magnetized surface is circularly shaped or curved. In addition, since a difference in magnetic field strength is reduced to make it possible to obtain an output waveform with high resolution.

Figure 4:
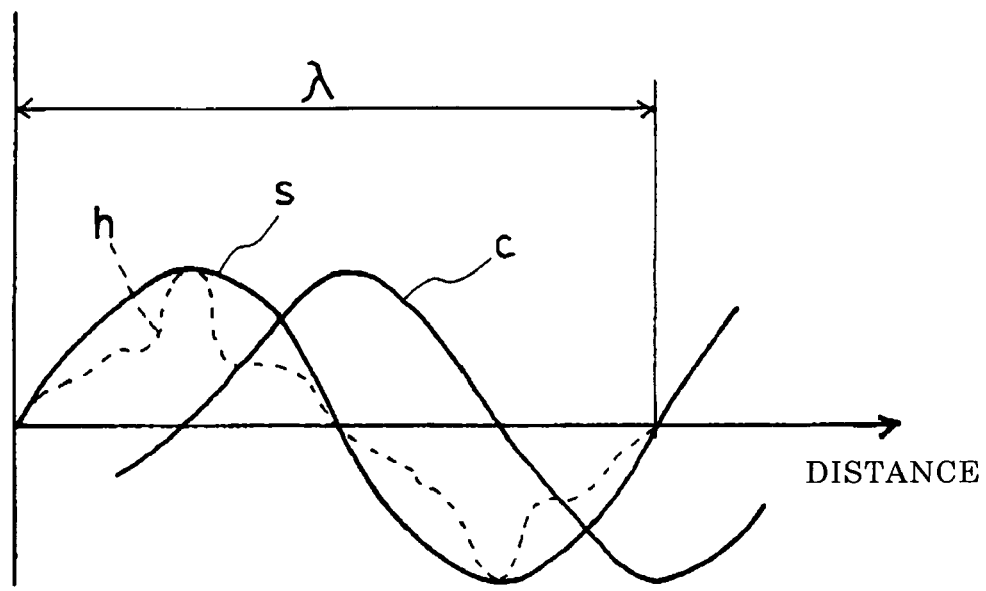
FIG. 4 is a view of an output waveform obtained from a magnetic position detecting apparatus illustrated in FIG. 3.
Figure 5:
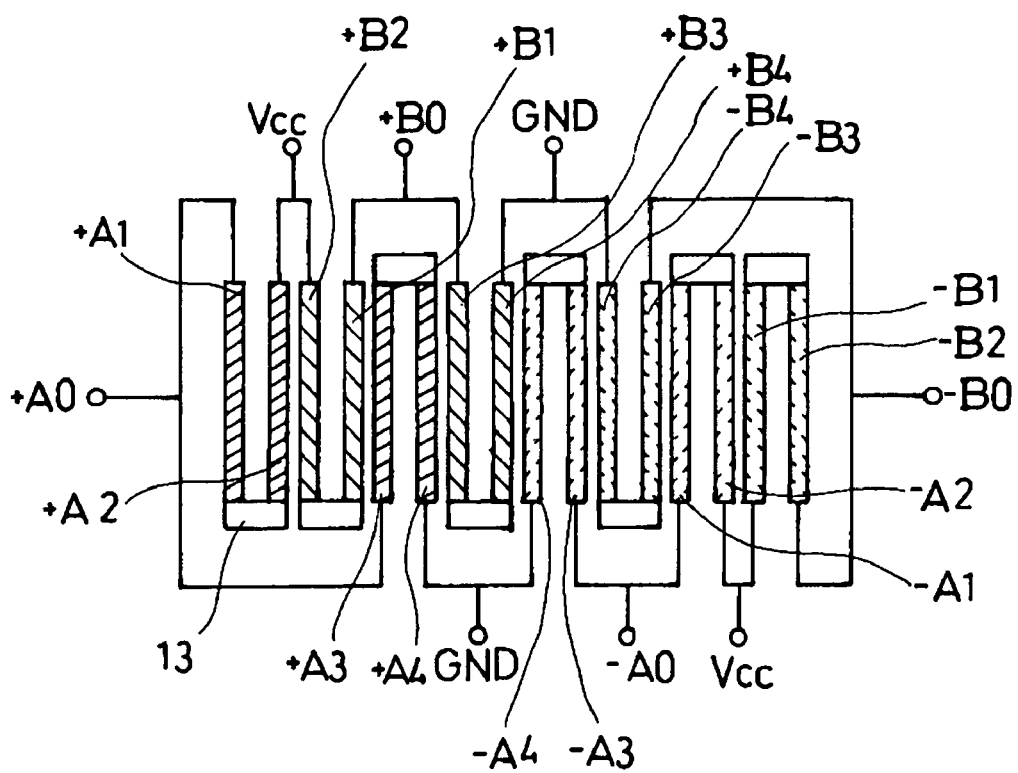
FIG. 5 is a view schematically illustrating a pattern circuit of a magnetic position detecting apparatus illustrated in FIG. 1.

In the magnetic resistance elements +A3, −A3, +B3, −B3 that are shifted by λ/n with respect to the reference magnetic resistance elements +A1, −A1, +B1, −B1, respectively, the even harmonic component of the output wavelength can be corrected. In the magnetic resistance elements +A4, +A2, −A4, −A2, +B4, +B2, −B4, −B2 that are shifted by λ/3m, respectively, the odd harmonic component of the output wavelength is corrected, thereby making it possible to obtain a sine waveform S and a cosine waveform C in a state that a reference wavelength h is adjusted as illustrated in FIG. 4. Such adjusted sine waveform S and cosine waveform C are obtained, thereby making it possible to accurately detect a position within the width λ and improve resolution.

Moreover, in the present embodiment, as illustrated in FIG. 4, the sine waveform S and the cosine waveform C are output simultaneously, thereby making it possible to detect a relative moving direction and a moving speed of the magnetic position detecting apparatus 1 to the magnetized surface 3. Thus, the detection of the moving speed makes it possible to substantially simultaneously set the zoom lens and the focus lens of the camera when the magnetic position detecting apparatus is used as the position sensor that drives the zoom lens and the focus lens as an application example.

Since the respective magnetic resistance elements +A1 to +A4, −A1 to −A4, +B1 to +B4, −B1 to −B4 are arranged in parallel to one another along the current path, respectively, the connecting portion 13 for connecting each of the parallel-arranged magnetic resistance elements +A1 to +A4, −A1 to −A4, +B1 to +B4, −B1 to −B4 cannot be placed in parallel to the current path. However, the connecting portion 13 is formed of not the magnetic resistance element but conductive material, so that output can be obtained in a state that no influence of magnetic field of the magnetized surface is exerted upon the connecting portion 13 and the waveform accuracy of the output waveform can be further improved.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

Figure 7A:
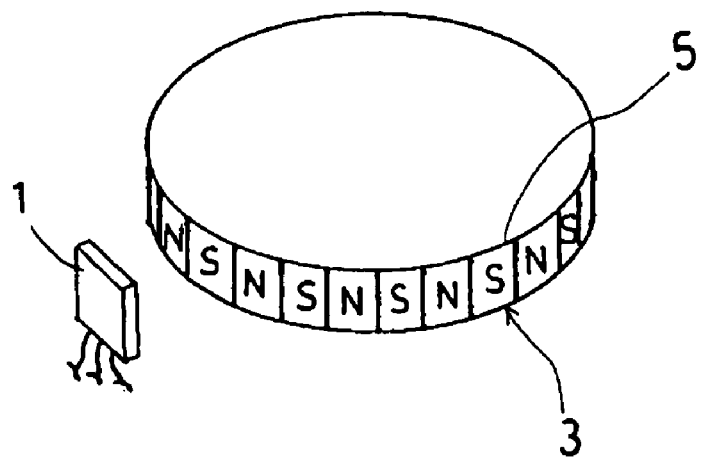
FIG. 7A is a perspective view illustrating a magnetic position detecting apparatus according to a modification.
Figure 7B:
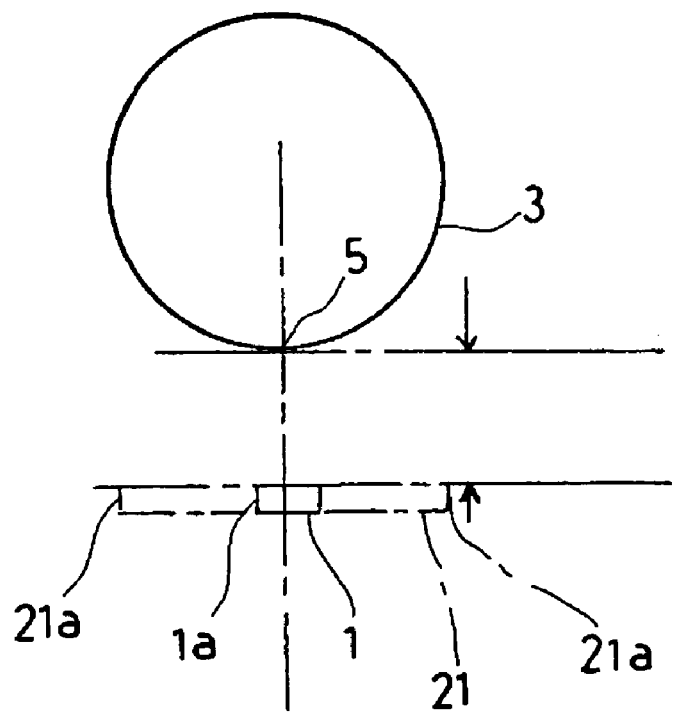
FIG. 7B is a plane view illustrating a magnetic position detecting apparatus according to a modification.

For example, the magnetic position detecting apparatus 1 is not limited to the use of the linear driving. For example, the magnetized surface 3 may be formed along the circumference as illustrated in FIG. 7A to detect the rotational position by the magnetic position detecting apparatus 1. In this case, as illustrated in FIG. 7B, when the respective magnetic resistance circuits are horizontally arranged (alternate long and short dash line illustrated in the figure) as in the conventional technique, there is a disadvantage in which magnetic field strength received at both ends 21a is reduced. However, since the magnetic position detecting apparatus 1 according to the present embodiment reduces the width in the magnetizing direction, it is possible to decrease the difference in magnetic intensity which each magnetic resistance element receives at the end portion 1a. Accordingly, it is possible to perform highly accurate position detection.

Figure 6:
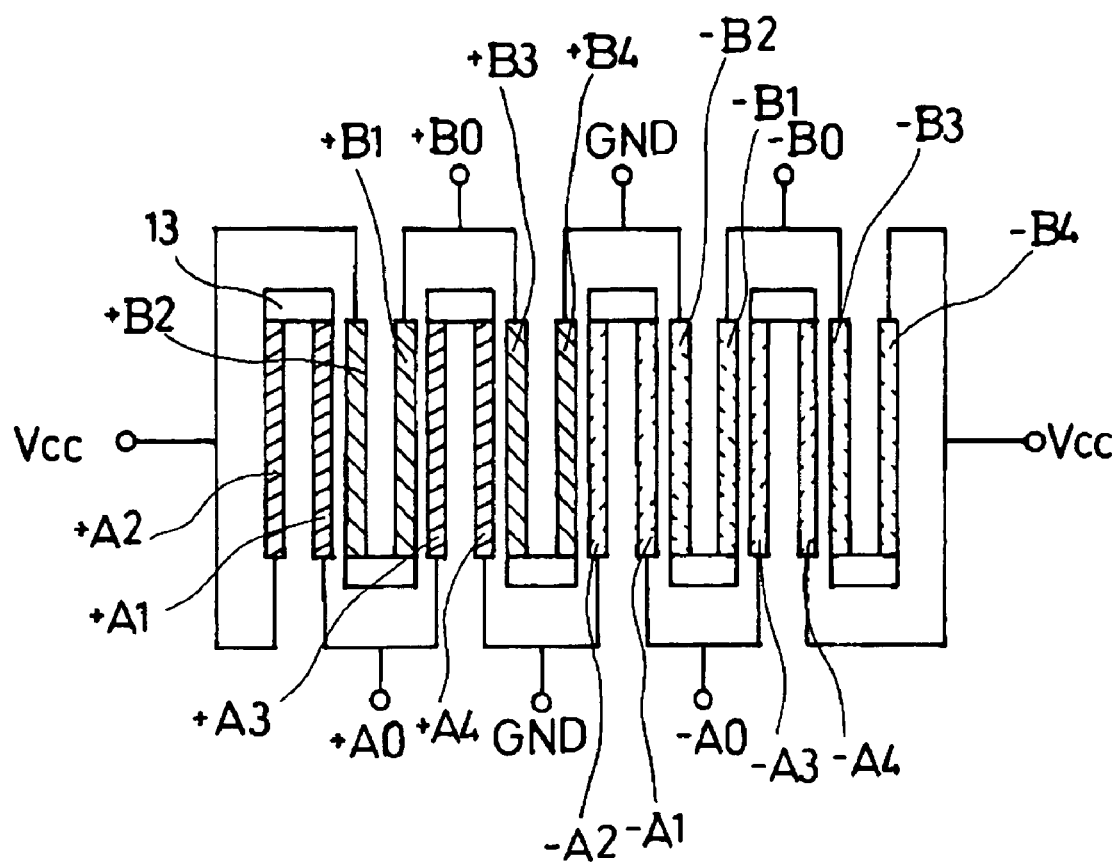
FIG. 6 is a view schematically illustrating a pattern circuit of a magnetic position detecting apparatus according to a modification.

The arrangement of the respective magnetic resistance elements in the first magnetic resistance circuit A and the second magnetic resistance circuit B is not limited to the aforementioned embodiment. An arrangement where the respective magnetic resistance elements are rearranged to have substantially the same function and effect, for example, the arrangement as illustrated in FIG. 6 may be provided.

In the aforementioned embodiment, the first magnetic resistance circuit A includes two magnetic resistance subcircuits +A and −A. However, only one subcircuit +A or −A may be possible. Similarly, the second magnetic resistance circuit B may include only one subcircuit +B or −B.

The magnetic position detecting apparatus 1 according to the present invention is not limited to the camera. The magnetic position detecting apparatus 1 can be used in position control of a machine tool and can be used as a so-called encoder and the use thereof is not limited.

What is claimed is:

1. A magnetic position detecting apparatus comprising:
a first magnetic resistance circuit and a second magnetic resistance circuit, each of the first and second magnetic resistance circuits having multiple magnetic resistance elements arranged to be opposite to a magnetized surface where different magnetic poles are alternatively provided, and each of the first and second magnetic resistance circuits being operable to output current according to a magnetic field strength of the magnetized surface;
a power supply terminal;
a first output terminal provided in the first magnetic resistance circuit; and
a second output terminal provided in the second magnetic resistance circuit;
wherein the first and the second magnetic resistance circuits are arranged such that the magnetic resistance elements of each of the first and the second magnetic resistance circuits are connected to one another in series and are arranged in a comblike shape so as to be parallel to one another along a current path of each of the magnetic resistance elements, wherein the magnetic resistance elements of at least one of the first magnetic resistance circuit or the second magnetic resistance circuit include a reference magnetic resistance element and correction magnetic resistance elements, wherein the correction magnetic resistance elements include an even harmonic correction magnetic resistance element that is shifted by ($\lambda$/n) from the reference magnetic resistance element, and an odd harmonic correction magnetic resistance element that is shifted by ($\lambda$/2m) from the reference magnetic resistance element, wherein $\lambda$ is a width of a magnetic pole in an array direction of magnetic poles on the magnetized surface, wherein "n" is an even number except 0, and wherein "m" is an odd number except 1.

2. The magnetic position detecting apparatus according to claim 1, wherein a phase difference between output waveforms of the first magnetic resistance circuit and the second magnetic resistance circuit is shifted by 90°.

3. The magnetic position detecting apparatus according to claim 1, wherein a portion for connecting the respective magnetic resistance elements in series is formed of a conductive material.

4. The magnetic position detecting apparatus according to claim 1, wherein at least some of the magnetic resistance elements of the second magnetic resistance circuit are placed between the magnetic resistance elements of the first magnetic resistance circuit.

* * * * *